(12) United States Patent
Vargas

(10) Patent No.: US 7,261,655 B2
(45) Date of Patent: Aug. 28, 2007

(54) VARIABLE SPEED FLAT BELT TRANSMISSION AND VARIABLE DIAMETER PULLEY FOR USE IN SAME

(76) Inventor: Eladio A. Vargas, 1421 Rosebud La., Glenview, IL (US) 60025

( * ) Notice: Subject to any disclaimer, the term of this patent is extended or adjusted under 35 U.S.C. 154(b) by 651 days.

(21) Appl. No.: 10/877,741

(22) Filed: Jun. 24, 2004

(65) Prior Publication Data

US 2005/0288137 A1    Dec. 29, 2005

(51) Int. Cl.
*F16H 55/52* (2006.01)
*F16H 55/54* (2006.01)
*F16H 59/02* (2006.01)

(52) U.S. Cl. ............... 474/49; 474/47; 474/51
(58) Field of Classification Search ............ 474/47–57, 474/64–69, 100, 205, 237
See application file for complete search history.

(56) References Cited

U.S. PATENT DOCUMENTS

| | | | | |
|---|---|---|---|---|
| 672,962 | A * | 4/1901 | Seymour | 474/53 |
| 789,136 | A | 5/1905 | Barber | |
| 896,160 | A | 8/1908 | Rosewarne | |
| 4,024,772 | A | 5/1977 | Kumm | |
| 4,068,539 | A | 1/1978 | Nyc | |
| 4,295,836 | A | 10/1981 | Kumm | |
| 4,516,960 | A * | 5/1985 | Rathert | 474/49 |
| 4,591,351 | A | 5/1986 | Kumm | |
| 4,714,452 | A | 12/1987 | Kumm et al. | |
| 4,768,996 | A * | 9/1988 | Kumm | 474/49 |
| 4,810,234 | A | 3/1989 | Kumm | |
| 4,854,921 | A * | 8/1989 | Kumm | 474/49 |
| 4,875,894 | A * | 10/1989 | Clark | 474/49 |
| 5,011,458 | A * | 4/1991 | Kumm | 474/49 |
| 5,443,423 | A * | 8/1995 | Ha | 474/47 |
| 5,547,428 | A | 8/1996 | Matsuda et al. | |
| 5,830,093 | A * | 11/1998 | Yanay | 474/49 |
| 6,152,844 | A * | 11/2000 | Daugherty | 474/49 |
| 6,458,054 | B1 * | 10/2002 | Mimura | 474/100 |
| 7,077,771 | B2 * | 7/2006 | Jeng | 474/49 |

* cited by examiner

*Primary Examiner*—Marcus Charles
(74) *Attorney, Agent, or Firm*—Welsh & Katz, Ltd.

(57) ABSTRACT

A belt drive system employs variable diameter drive and driven pulleys interconnected by a flat belt and operative to vary the rotational speed of the driven pulley as in a variable speed transmission. Each pulley includes an internal fluid pressure chamber and diametrically aligned pairs of radially movable pistons or lift bars that support transverse lift rods at their outer ends. Axially spaced circular guide plates form end boundaries for the fluid pressure chamber and have radial through-slots that cooperate with arcuate slots in juxtaposed pairs of coaxial guide discs to receive opposite ends of the lift rods and effect synchronous radial movement of the lift rods in response to pressure changes within the fluid pressure chamber. An elongated flexible spring-like support member is attached at one end to a lift rod and extends in supported relation circumferentially over and about the lift rods to define a variable diameter belt support surface. The diametrically aligned pistons are adapted for telescoping relation during radial inward movement of the lift rods, thereby enabling greater variance in the diameter of the belt support surface for a given size pulley. Electronic sensors sense the rotational position of each pulley during rotation and cooperate with a source of fluid pressure to maintain the desired pulley diameter and belt tension.

28 Claims, 5 Drawing Sheets

VARIABLE SPEED FLAT BELT TRANSMISSION AND VARIABLE DIAMETER PULLEY FOR USE IN SAME

FIELD OF THE INVENTION

The present invention relates generally to variable diameter pulleys that find particular application in variable speed flat belt transmissions, and more particularly to a variable diameter pulley that employs an improved arrangement of fluid pressure actuated lift rods, guide plates and guide discs that effect simultaneous equal radial movement of the lift rods relative to the rotational axis of the pulley during changes in the diameter of an annular belt support surface supported by the lift rods.

BACKGROUND OF THE INVENTION

Variable speed transmissions are known that utilize variable diameter pulleys interconnected by a flat belt so as to create a drive pulley and a driven pulley. See, for example, U.S. Pat. Nos. 4,024,772, 4,295,836 and 4,714,452. The variable diameter pulleys utilized in known variable speed mechanisms or transmissions employ parallel belt support members disposed on a common diameter coaxial with the rotational axis of the pulley and adapted for radial adjustment so as to vary the relative rotational speed ratio between the drive and driven pulleys. Various types of belt support members are employed, such as rollers or bars having opposite ends extending through radial slots formed in axially spaced rotatably driven primary plates or discs and into spiral grooves formed in pairs of secondary discs disposed outboard of the radial slotted discs. The outboard pairs of secondary discs are rotatable with the driven primary plates and are also caused to rotate relative to each other so as to effect radial movement of the belt support rollers or bars within the radial slots relative to the rotational axis of the pulley. See for example, U.S. Pat. No. 896,160. See also U.S. Pat. No. 4,591,351 which discloses a variable radius pulley employing pairs of laterally spaced pulley sheaves to support parallel belt drive elements. Each sheave comprises two juxtaposed circular discs having oppositely directed spiral grooves that intersect and receive the ends of parallel belt support drive elements. The discs are rotated relative to each other for varying the radial positions of the belt drive elements and thereby the radius of the pulley belt drive.

Variable diameter pulleys for use in transmission mechanisms are also known that employ fluid pressure to move pistons or sliders radially and thereby vary the diameter of a transmission belt support surface, as disclosed in U.S. Pat. No. 5,547,428. A significant drawback in the known variable diameter pulleys employed in variable speed transmissions or belt drive systems is that they are relatively complex and do not provide the precision incremental adjustment desired for variable speed belt transmissions.

BRIEF SUMMARY OF THE INVENTION

In accordance with a presently preferred embodiment of the present invention, a belt drive system is provided that employs a variable diameter drive pulley and a variable diameter driven pulley interconnected by a flat belt and operative to vary the rotational speed of the driven pulley as in a variable speed transmission. Each pulley includes an internal fluid pressure chamber and diametrically aligned pairs of radially movable pistons or lift bars that support transverse lift rods at their outer ends such that the lift rods lie on a common but variable diameter coaxial with the rotational axis of the pulley. Axially spaced circular guide plates are fixed coaxially with and transversely to the rotational axis of each pulley and form end boundaries for the fluid pressure chambers. The guide plates have radial through-slots that receive the opposite ends of the lift rods and cooperate with juxtaposed pairs of coaxial guide discs that are supported for rotation relative to the corresponding guide plates and relative to each other in opposite directions. The guide discs have arcuate grooves formed therethrough that are configured to overlap and intersect the radial slots in the guide plates so as to receive the opposite ends of the lift rods and effect equal synchronous radial movement of the lift rods in response to radial forces imparted from the belt and pressure changes within the fluid pressure chamber. Each pulley includes an elongated flexible spring-like belt support member attached at one end to a lift rod so as to extend in supported relation circumferentially about the lift rods and define a variable diameter belt support surface. The diametrically aligned pistons are adapted for telescoping relation during radial inward movement of the lift rods, thereby enabling greater variance in the diameter of the belt support surface for a given size pulley. An electronic or photoelectric sensor senses the rotational position of each pulley during rotation and cooperates with a source of fluid pressure to maintain a pressure within the fluid pressure chamber necessary to obtain the desired pulley diameter and belt tension.

Accordingly, a general object of the present invention is to provide a belt drive system that employs variable diameter drive and driven pulleys interconnected by a flat belt, and wherein the pulleys each include a novel combination of components that enable exacting variation in the rotational speed of the driven pulley.

A more particular object of the present invention is to provide a variable diameter pulley that employs diametrically aligned pairs of pistons adapted for telescoping relation during radially inward movement so as to reduce the diameter of a circumferential belt support surface, thereby enabling a greater variable diameter belt support surface range for a given size pulley.

Another object of the present invention is to provide a variable diameter pulley particularly adapted for use in a variable speed flat belt transmission and wherein the variable diameter pulley employs pairs of radial coplanar pistons that support and effect radial movement of parallel lift rods having opposite ends extending through radial slots formed in axially spaced guide plates and through pairs of relatively rotatable guide discs juxtaposed to and outboard of each guide plate, each pair of guide discs having oppositely directed arcuate slots or guideways adapted to receive the corresponding lift rod ends so as to assure equal synchronized radial movement of all of the lift rods while maintained in parallel relation to the longitudinal axis of rotation of the pulley.

Still another object of the present invention is to provide a variable diameter pulley as aforedescribed wherein a flat flexible spring-like member has an end secured to a selected one of the lift rods and extends circumferentially about the pulley supported on the lift rods to define a belt support surface. A free end of the spring-like member can be sensed during each rotation of the pulley for initiating a fluid pressure pulse acting on the lift rod support pistons.

Further object, features and advantages of the present invention, together with the manner of operation thereof, will become apparent to those skilled in the art from the following detailed description of the invention when taken in conjunction with the accompanying drawings wherein like reference numbers designate like elements throughout the several views.

DETAILED DESCRIPTION OF THE INVENTION

Figure 1:
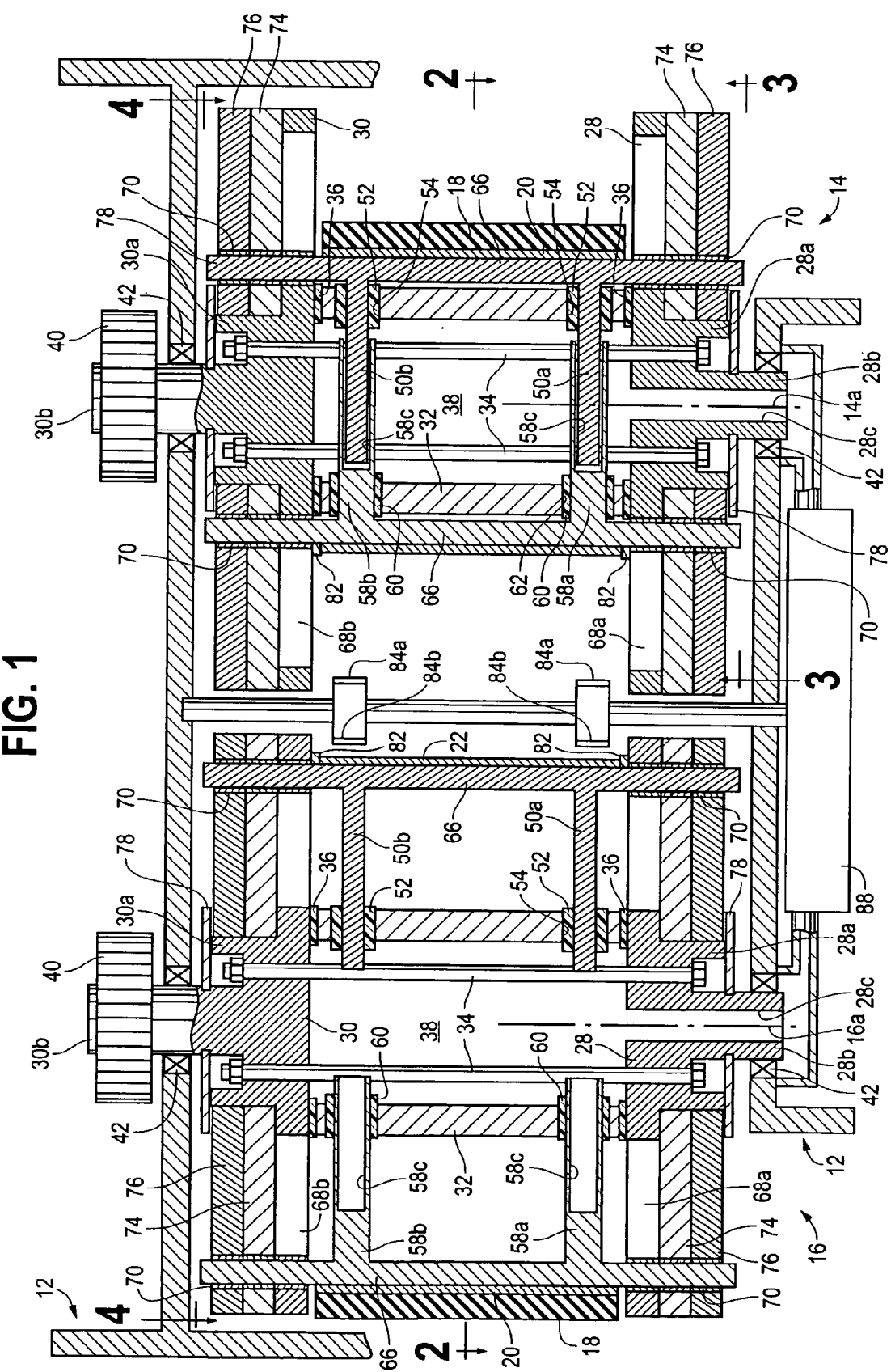
FIG. 1 is a sectional view of a flat belt drive system constructed in a accordance with the invention, taken in a plane containing the parallel longitudinal rotational axes of a pair of variable diameter pulleys supported in a housing.

The present invention is susceptible of various forms. Accordingly, there is shown in the drawings, and will hereinafter be described, preferred exemplary but non-limiting embodiments of the invention with the understanding that the described embodiments are not intended to limit the invention to the specific embodiments disclosed.

Referring now to the drawings, and in particular to FIG. 1, a variable speed flat belt transmission constructed in accordance with a preferred embodiment of the invention is indicated generally at 10. Very generally, the variable speed flat belt transmission 10, which may alternatively be referred to as a variable speed transmission or a belt drive system, includes a housing 12 adapted to receive and support a variable diameter drive pulley 14 and a variable diameter driven pulley 16. The drive pulley 14 and driven pulley 16 are substantially identical and are supported by the housing 12 so as to define parallel coplanar longitudinal rotational axes 14a and 16a, respectively. The drive and driven pulleys 14 and 16 are interconnected by a flat belt 18, termed a transmission drive belt, that is supported on variable diameter belt support surfaces 20 formed on the pulleys, as well be described. The drive belt 18 is made of a conventional strong tough heat resistant material as utilized in transmission belts and is of fixed length so that increasing or decreasing the belt drive surface diameter of the drive pulley requires a corresponding but opposite increase or decrease in the belt drive surface diameter of the driven pulley, as when varying the rotational speed of the driven pulley. As will be described, the belt drive system 10 includes means in the form of fluid pressure actuated radially disposed pairs of pistons or lift bars for varying the diameter of the belt support surfaces 20 and thereby the rotational speed ratio between the drive and driven pulleys.

Turning now to a more detailed description, each of the variable diameter pulleys 14 and 16 includes a pair of axially spaced circular guide plates 28 and 30 that are maintained in fixed parallel relation by cylindrical annular spacer sleeves 32. The guide plates 28 and 30 are secured in axially aligned relation against opposite ends of their respective spacer sleeves 32 by a plurality of connector rods 34 that lie on a common diameter coaxial with and spaced about the rotational axes 14a and 16a of the variable diameter pulleys. Annular seals 36 are interposed between the ends of the spacer sleeves 32 and the guide plates 28 and 30. In this manner, the laterally spaced guides plates 28 and 30 and associated spacer sleeves 32 define the boundaries of cylindrical internal fluid pressure chambers 38.

As illustrated in FIG. 1, the guide plates 28 and 30 have generally cylindrical hub portions indicated at 28a and 30a, respectively, on which are formed equal diameter cylindrical axle extensions 28b and 30b coaxial with the center axes of the guide plates. The axle extensions 28b have axial bores 28c to facilitate fluid pressure flow into and out of the fluid chambers 38, as will be described. The axle extension 30b for the drive pulley 14 serves as the drive or input shaft to the drive pulley 14 and has a suitable drive means, such as a spur gear 40, mounted in fixed relation thereon to facilitate positive connection of the drive pulley 14 to an external drive means. The axle extension 30b on the driven pulley 16 preferably has a similar spur gear 40 mounted thereon enabling positive mechanical connection to a gear box or other driven means so that the axle 30b serves as the output shaft for the variable speed flat belt transmission or belt drive system 10. The guide plates 28 and 30 are preferably made of a suitable strength metallic or heat resistant plastic or composite material and are supported by the housing 12 through annular bearings 42 of conventional design so that the axes of the drive and driven pulleys 14 and 16 are parallel and coplanar. The housing 12 is configured to substantially enclose the pulleys 14 and 16 but has suitable preferably filtered openings (not shown) to facilitate passage of cooling air internally of the housing for cooling of the internal components.

Each of the annular spacer sleeves 32 supports an array of high strength pistons, alternatively termed lifting bars, so that the pistons or lifting bars are arranged in axially spaced pairs having the longitudinal axes of each pair lying in parallel planes transverse to the rotational axes 14a and 16a of the pulleys 14 and 16, and lying in a common radial plane containing the corresponding rotational axis 14a, 16a. As illustrated in FIG. 1, a first pair of axially spaced, parallel, radially coplanar cylindrical pistons or lifting bars 50a and 50b are supported by each spacer sleeve 32 for radial movement relative to the corresponding rotational axes 14a and 16a. The pistons 50a and 50b are preferably made of solid steel or other suitable strength material and extend through annular seal/bearings 52 that in turn are fixedly supported within suitably radial bores 54 formed in axially spaced relation along the sleeves 32. Each pair of axially spaced cylindrical pistons or lift bars 50a and 50b is supported in diametrical aligned relation with a second pair of axially spaced, parallel radial pistons 58a and 58b that are in turn supported by annular seal-bearings 60 within similar bores 62 in the sleeves 32 so that the longitudinal axes of the pistons 58a, b are axially aligned with the longitudinal axes of the opposed pistons 50a,b. The pistons or lift bars 58a,b have longitudinal cylindrical bores 58c sized to receive the opposed axially aligned solid pistons 50a,b in telescoping relation. The diameters of the pistons 50a,b and bores 58c are sized to create an annular space between the pistons 50a,b and the bores 58c sufficient to allow fluid pressure flow peripherally of the solid pistons when in telescoping relation within the pistons 58a,b. The depth of each bore 58c is slightly greater than the length of a piston 50a,b that extends into the bore when the pistons 50a,b and 58a,b are disposed in their radially i innermost telescoping positions, thereby enabling fluid pressure to act on the oppositely facing end surfaces of the pistons and bores Referring to FIG. 2, each of the annular spacer sleeves 32 supports a plurality of pairs of diametrically aligned pistons or lift bars 50a,b and 58a,b that are spaced along the longitudinal length of the spacer sleeves so as not to interfere with the next adjacent diametrically aligned pistons or lift bars. The various diametrically opposed pairs of pistons or lift bars thus have their axes disposed radially to the rotational axis of the corresponding pulleys 14 and 16 but are spaced along the corresponding spacer sleeves, preferably in generally equidistant spaced relation. In the illustrated embodiment, three diametrically opposed pairs of pistons 50a,b and 58a,b are employed with each diametrically aligned piston pair being disposed between a pair of the connecting rods 34. In this manner, the diametrically aligned pistons 50a,b and 58a,b can be moved radially between inner positions disposed in telescoping relation, as illustrated for the drive pulley 14 in FIG. 2, and radially extended positions as shown for the driven pulley 16 in FIG. 2.

In the illustrated embodiment, each pair of diametrically opposed pistons 50a,b and 58a,b has an elongated generally cylindrical lift rod 66 secured to their radial outer ends in transverse relation to the axes of the pistons. The lift rods 66 may be formed integral with or otherwise suitably secured to their associated pistons 50a,b and 58a,b so as to extend in parallel relation to the rotational axes 14a and 16a of the pulleys. Each of the lift rods 66 is of a length sufficient to extend through radial slots 68a and 68b formed, respectively, in the guide plates 28 and 30. Again referring to FIGS. 2 and 3, the radial slots 68a and 68b are circumferentially spaced about the rotational axes of the pulleys so that the radial centerline of each slot 68a,b lies in a plane containing the rotational axis of the corresponding pulley and the longitudinal axes of the associated diametrically aligned pistons 50a,b and 58a,b. Sleeve bearings or bushings 70 are supported on the opposite ends of the lift rods for sliding relation within the slots 68a,b. In this manner, the radial slots 68a,b guide the lift rods 66 as their associated actuating pistons or lift bars 50a,b and 58a,b are moved radially relative to the spacer sleeves 32 in response to fluid pressure changes within the fluid pressure chambers 38.

Each of the pulleys 14 and 16 include means for effecting equal radial synchronous movement of the lift rods 66 in response to axial forces imparted to the associated pairs of pistons 50a,b and 58a,b. Such means includes pairs of circular guide discs 74 and 76 having diameters generally equal to the diameter of the circular guide plates 28 and 30. The pairs of guide discs 74 and 76 are rotatably mounted on the hub portions 28a and 30a of the axially spaced guide plates 28, 30 so as to be disposed in juxtaposed relation to the outwardly facing surfaces of the guide plates, as illustrated in FIG. 1. Each pair of guide discs 74 and 76 is rotatably mounted on a hub portion 28a or 30a so as to be rotatable relative to the adjacent guide plate and rotatable relative to each other in opposite rotational directions. The guide discs 74 and 76 are retained in assembled relation on the hubs 28a and 30a in juxtaposed relation to the associated guide plates 28 and 30 by snap-on retaining rings 78.

Figure 3:
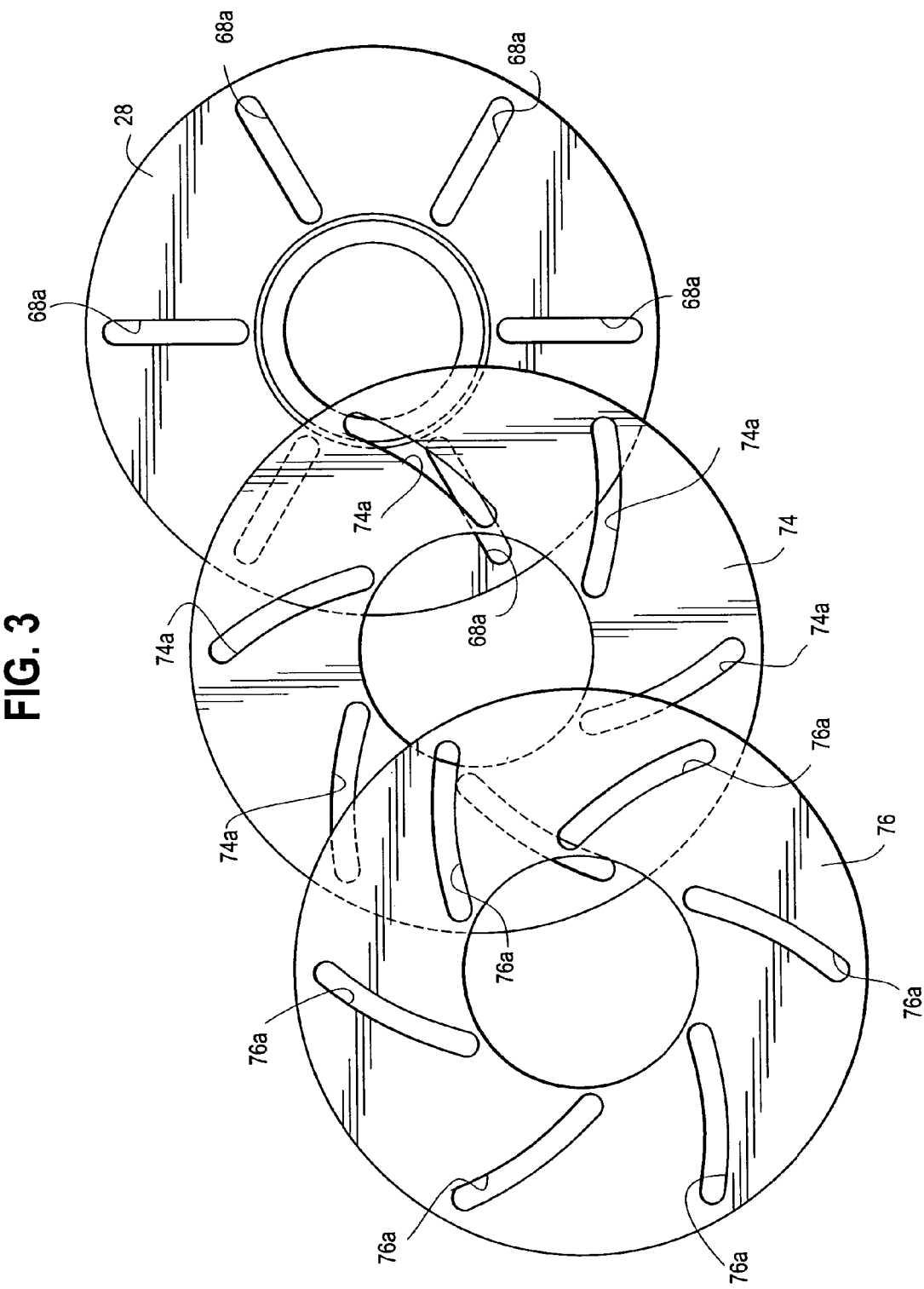
FIG. 3 is an elevational view taken generally along line 3-3 of FIG. 1 but illustrating a primary guide plate and juxtaposed guide discs separated from their normal coaxially relation to better show the respective radial and arcuate slots through which ends of the lift rods extend.
Figure 4:
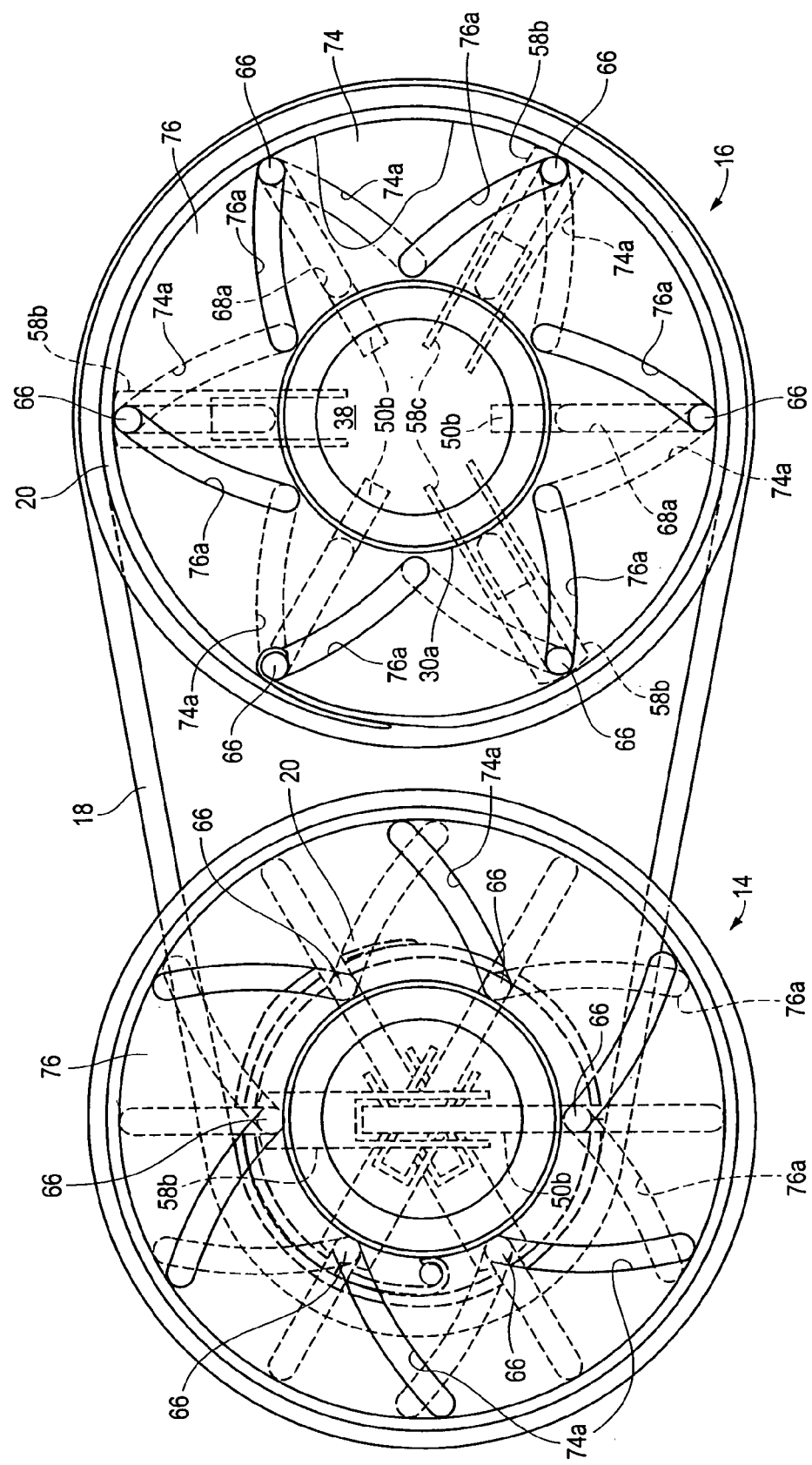
FIG. 4 is a schematic elevational view taken substantially along line 4-4 of FIG. 1 illustrating the guide discs and guide plates of FIG. 3 in coaxial relation with the corresponding belt support lift rods in the drive and driven pulleys shown in their respective radial outermost and innermost positions.

Referring to FIGS. 3 and 4, each of the guide discs 74 and 76 has a plurality of similarly shaped arcuate slots therethrough as indicated at 74a and 76a. The arcuate slots 74a and 76a are equally circumferentially spaced about the center axes of the guide discs and are equal in number to the radial slots 68a and 68b formed in the guide plates 28 and 30. The arcuate slots 74a and 76a are inclined in opposite arcuate directions relative to the corresponding rotational axes of the guide discs, and are configured so that the arcuate slots 74a are adapted to intersect the arcuate slots 76a and the associated radial slots 68a and 68b when the guide discs and guide plates are disposed in juxtaposed coaxial relation as illustrated in FIG. 4. In this manner, the opposite ends of the lift rods 66 and their associated bushings 70 extend through the radial slots 68a,b and the arcuate slots 74 a,b in the guide plates and guide discs. It will be understood that as the lift rods 76 are moved radially relative to the rotational axes of the pulleys 14 and 16 responsive to fluid pressure changes within the fluid pressure chambers 38, the arcuate slots 74a and 76a in the guide discs 74 and 76 cause the lift rods to move equally in synchronized relation while being maintained in parallel relation to the rotational axes of the pulleys.

Figure 2:
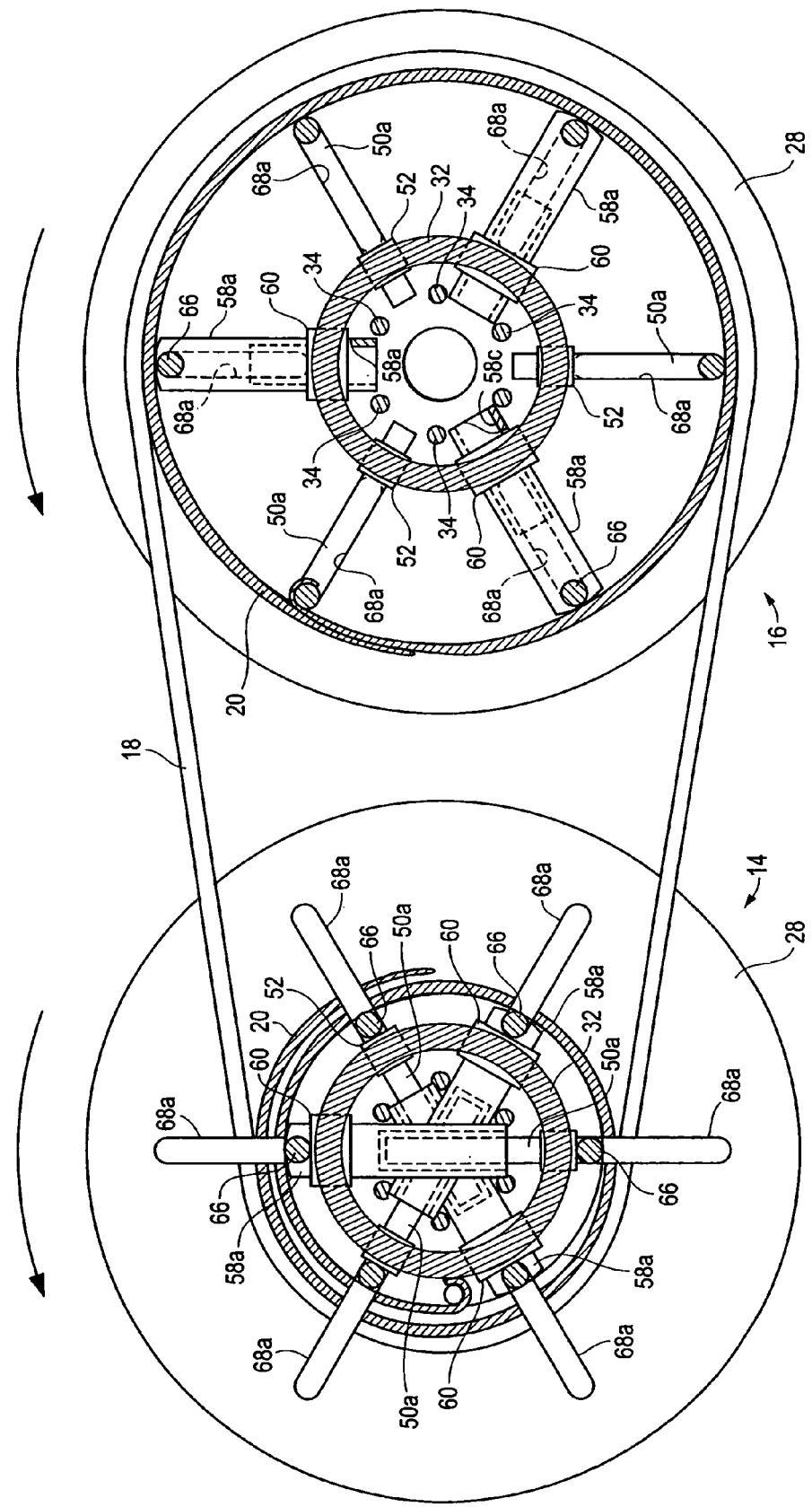
FIG. 2 is a sectional view taken generally along the line 2-2 of FIG. 1, portions being broken away for clarity.

Referring again to FIG. 2 taken in conjunction with FIG. 1, each of the peripheral belt support and drive surfaces 20 is defined by a metallic spiral spring-like member having a transverse width slightly less than the distance between the opposed inner surfaces of the guide plates 28 and 30. The spiral spring-like members 20 have longitudinal lengths sufficient to wrap or extend around and over the array of parallel lift rods 66 throughout the full range of movement of the lift rods between their radially inward positions and their maximum outermost radial positions. Each spiral spring-like belt support member 20 is secured at one end to one of the lift rods 66, as by being pinched about the lift rod without interfering with the associated pistons 50a,b or 58a,b, and is then spirally wrapped about and over the remaining lift rods and continued in overlapping relation to itself as shown in FIG. 2. The spiral spring-like members 20 may be made, for example, from a suitable strength flexible spring steel or the like so as to remain in a wrapped generally circular condition about the lift rods coaxial with the rotational axes of the corresponding pulleys, but enable full radial extension and retraction of the lift bars in response to fluid pressure changes within the chambers 38. The free end of each belt support member 20 is preferably tapered, as indicated at 20a, without creating a sharp pointed end.

Preferably, means are provided to detect the tail ends of the spiral belt support members 20 when the tail ends are not engaged by the drive belt 18. To this end, the free end of each spirally wrapped belt support member 20 may have a pair of laterally spaced magnets 82 affixed to the terminal ends of its longitudinal marginal edges, as shown in FIG. 1. The magnets 82 enable the tail ends of the belt support members 20 for the drive and driven pulley 14 and 16 to be detected by electronic motion sensors 84a and 84b, respectively, during each revolution of the pulleys 14 and 16. The motion sensors 84a and 84b may be of conventional design, such as Hall effect sensors, and are positioned so as to detect when the tail ends of the belt support members 20 are not engaged by the driven belt 18. Alternatively, the sensors 84a and 84b may comprise photoelectric sensors operative to detect light responsive tape or other means applied to the tail ends of the belt support members 20. The sensors 84a,b are adapted to provide electronic signals indicating when the tail ends of the belt support members 20 on the pulleys 14 and 16 are not engaged by the belt 18 so that a source of fluid pressure, preferably a source of hydraulic fluid pressure indicated schematically at 88 that communicates with the inlet ports 28c to the internal fluid pressure chambers 38 in the pulleys, can be activated to selectively introduce fluid pressure into, or release fluid pressure from, the fluid pressure chambers when the tail ends of the belt support members are not engaged by the belt 18. This prevents the drive belt 18 from engaging two underlying surfaces of the belt support members 20 that are moving in opposite directions. For example, as the diameter of each belt support member 20 is increased or decreased during a change in the output r.p.m. of the drive pulley for a given input r.p.m. to the drive pulley 14, the tail end of each belt support member will undergo movement relative to its underlying portion. By limiting the change in diameter of the pulley belt support members to incremental changes when the tail ends are not engaged by the drive belt 18, wear of the belt is significantly reduced. Also, by preventing the drive belt 18 from contacting the tail ends of the belt support members 20 during increase or decrease of the belt support member diameters, movement of the tail ends of the support members relative to their underlying portions is not inhibited by the drive belt. The fluid pressure source 88 includes one or more fluid pressure sensors that sense the fluid pressure inside each of the fluid pressure chambers 38 so that an external fluid pressure pump (not shown) can be controlled by the fluid pressure sensors and the tail end position sensors 84a,b to vary the fluid pressure within the chambers 38 for controlling the diameter of the corresponding belt support surfaces 20 so that the drive belt 18 is continually in tension and effects positive interconnection between the pulleys 14 and 16.

In operation, by an operator varying the fluid pressure within the fluid pressure chambers 38 in the drive and driven pulleys 14 and 16, the corresponding pairs of pistons or lift bars 50a,b and 58a,b can be made to extend radially outwardly or contract radially inwardly causing the associated spiral spring-like belt support members 20 to expand or contract, thus varying and controlling the diameter of the belt support surfaces 20 on the pulleys. As the pistons 50a,b and 58a,b move radially in response to changes in fluid pressure within the fluid pressure chambers 38, the guide discs 74 and 76 rotate relative to each other in opposite directions and act on the ends of the lift rods 66 so as to maintain equal synchronized radial movement of the lift rods and maintain them in a circular array during full rotation of the pulleys. In this manner, the guide discs prevent deformation of the circular structure of the belt support surfaces 20 by preventing radial movement of the lift rods 66 that are not in immediate underlying relation to the belt support surface 20 and associated drive belt 18 during each revolution of the pulleys. Stated alternatively, the guide discs 74 and 76 prevent the lift rods 66 that are subjected to momentary radial inward pressure from the drive belt 18 during each revolution of the pulleys from moving radially inwardly a distance greater than the radial movement of the lift rods that are not at that moment being subjected to radial inward pressure from the drive belt. Nor will the latter lift rods be forced radially outwardly resulting in deformation of the circular structure of the pulley belt support surface as a result of a reduction in the internal fluid pressure within the pressurized chambers 38. As the radii of the belt support surfaces 20 of the pulleys expand and contract while the transmission belt 18 is in motion and under tension, the radius or diameter of each pulley belt support surface 20 is continually controlled when the tail end of each spiral belt support member 20 is momentarily not in contact with the transmission belt. The drive belt support member position sensors 84a,b detect when the tail ends of the spiral belt support members 20 pass the electronic sensors so that an output pulse is transmitted that can be used to cause the internal pressure in the chambers 38 to increase or decrease when the tail ends of the belt support members are not engaged by the belt 18. When the motion sensors 84a,b no longer detect that the tail end of a belt support member 20 is in non-contact with the drive belt 18, the corresponding pressure pulse is terminated prior to re-contact between the tail end of the associated belt support member and the drive belt so that the drive belt always remains under the desired tension and is not exposed to oppositely moving surfaces of the underlying belt support members 20.

Figure 5:
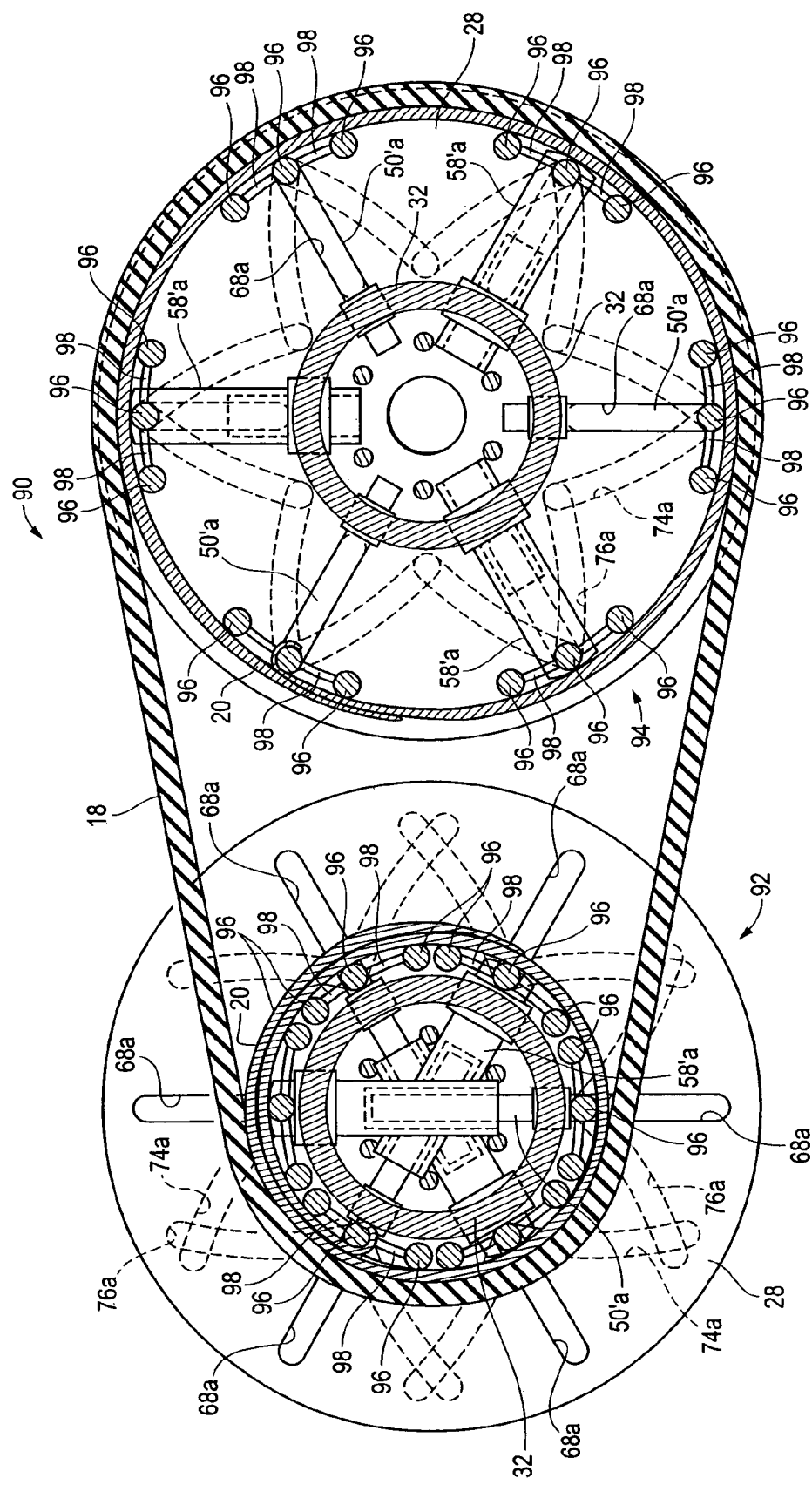
FIG. 5 is an elevational view similar to FIG. 2 but illustrating an alternative embodiment employing a plurality of lift rods supported on the outer ends of each pair of radially disposed actuating pistons.

FIG. 5 is a sectional view, similar to FIG. 2, of an alternative embodiment of a belt drive system or variable speed flat belt transmission, designated generally at 90, in accordance with the present invention. The belt drive system 90 is structurally similar to the belt drive system 10 and includes a variable diameter drive pulley 92 and a variable diameter driven pulley 94. Components of the pulleys 92 and 94 that are identical to the pulleys 14 and 16 are identified with identical reference numbers.

Each of the variable pulleys 92 and 94 thus includes a cylindrical spacer sleeve 32 that cooperates with axially spaced guide plates, one of which is shown at 30, to define an internal fluid pressure chamber 38. Each spacer sleeve supports pairs of axially spaced radially moveable pistons or lift bars 50'a,b and 58'a,b (only single pistons 50'a and 58'a being shown) that are substantially identical to pistons 50a,b and 58a,b and are supported in diametrical aligned relation similar to the pairs of pistons 50a,b and 58a,b in the pulleys 14 and 16. The pulleys 92 and 95 differ from pulleys 14 and 16 in that each pair of radial pistons or lift bars 50'a,b and 58'a,b supports a plurality of transverse lift rods 96 at the radial out ends of the piston pairs. In the embodiment of FIG. 5, each pair of axially spaced radial coplanar pistons 50'a,b and 58'a,b support three elongated equally spaced cylindrical lift rods 96 that in turn support elongated flexible spring-like belt support members 20 in similar fashion to the pulley 14 and 16.

The lift rods 96 are preferably supported on the pistons 50'a,b and 58'a,b in parallel spaced relation interconnected by connector bars 98 so that the axes of the lift rods 96 lie on a common diameter generally coaxial with the rotational axes of the pulleys 92 and 94. The center lift rod of each set of three connected lift rods 96 may be formed integral with or otherwise suitably secured transversely to its associated pair of pistons 50'a,b or 58'a,b so that the lift rods associated with each pair of pistons are supported in fixed relation to the pistons. The elongated spiral spring-like belt support members 20 have an end connected to one of the lift rods 96 on the corresponding pulley and extend over the remaining lift rods to define a circumferential belt support surface for a flat transmission belt 18 that interconnects the drive and driven pulleys 92 and 94.

The center lift rod of each set of three lift rods 96 has a greater longitudinal length than the other two lift rods of the set so that the ends of the center lift rod can extend through radial slots in the associated guide plates 28 and 30 and through intersecting arcuate slots 74a and 76a in juxtaposed pairs of guide discs 74 and 76, as do the lift rods 66 employed in the pulleys 14 and 16. In other respects the pulleys 92 and 94 and their method of operation are substantially identical to the pulleys 14 and 16 and need not be repeated.

While preferred embodiments of the present invention has been illustrated and described, it will be understood to those skilled in the art that changes and modifications may be made therein without departing from the invention and its broader aspects. Various features of the invention are defined in the following claims.

What is claimed is:

1. A variable diameter pulley comprising, in combination, a pair of guide plates supported in fixed axially aligned parallel spaced relation to each other and defining an axis of rotation disposed substantially normal to and intersecting said guide plates at substantially geometric centers thereof, said guide plates defining laterally opposed pairs of slots extending radially relative to said axis of rotation;
a first pair of guide discs each of which is disposed coaxially adjacent an outer surface of a selected one of said guide plates,
a second pair of guide discs each of which is disposed coaxially adjacent a selected one of said first discs so as to establish pairs of first and second discs, each pair of said first and second guide discs being rotatable relative to said adjacent guide plate and rotatable relative to each other about said axis of rotation and defining oppositely directed intersecting arcuate guideways,
a plurality of lift rods disposed parallel to said axis of rotation and each of which extends between said guide plates and has opposite ends extending through said guide plate slots and said arcuate guideways in said first and second guide discs at points of intersecting thereof,
means supported on said lift rods for defining a circumferential belt support surface generally coaxial with said axis of rotation, and
means for selectively moving said lift rods radially relative to said axis of rotation so as to vary the diameter of said belt support surface.

2. A variable diameter pulley as defined in claim 1 wherein said guide plates are circular and supported in coaxial relation for rotation about their center axes.

3. A variable diameter pulley as defined in claim 2 wherein said guide plates are maintained in axially spaced parallel relation by an annular spacer that cooperates with said guide plates to define an internal fluid pressure chamber.

4. A variable diameter pulley as defined in claim 3 wherein said annular spacer is interposed between said guide plates in coaxial relation thereto.

5. A variable diameter pulley as defined in claim 3 wherein one of said guide plates defines an axially disposed drive shaft, and wherein the other of said guide plates defines a fluid pressure inlet coaxial with said drive shaft and communicating with said fluid pressure chamber.

6. A variable diameter pulley as defined in claim 5 including a housing adapted to receive said variable diameter pulley within said housing with said drive shaft and said fluid pressure inlet being accessible from externally of said housing.

7. A variable diameter pulley as defined in claim 3 wherein said lift rod moving means includes a plurality of pistons carried by said annular spacer, said pistons being supported in laterally spaced, parallel, coplanar radial pairs with each pair of pistons supporting at outer ends thereof at least one of said lift rods so radial movement of said pistons effects a corresponding radial movement of said lift rods.

8. A variable diameter pulley as defined in claim 7 wherein each pair of pistons is supported in diametrical aligned relation with another pair of pistons, one pair of said diametrically aligned pairs of pistons comprising cylindrical piston rods and the other pair of said diametrically aligned pistons, each pair of diametrically aligned cylindrical piston rods and piston receiving sleeves being adapted for retracted telescoping relation in response to predetermined fluid pressure within said fluid pressure chamber.

9. A variable diameter pulley as defined in claim 8 wherein each of said piston rods and rod receiving sleeves extends radially through said annular spacer in guided sealed relation therewith, each of said piston rods being coaxially aligned with and adapted to telescope into a rod receiving sleeve.

10. A variable diameter pulley as defined in claim 9 wherein said piston rods and diametrically aligned rod receiving sleeves are adapted to move radially equidistantly from relative telescoped positions to extended non-telescoped positions in response to predetermined fluid pressure changes in said fluid pressure chamber.

11. A variable diameter pulley as defined in claim 9 including sealing means interposed between said annular spacer and each of said radially supported piston rods and rod receiving sleeves.

12. A variable diameter pulley as defined in claim 7 wherein each said pair of axially spaced pistons supports a plurality of transverse lift rods at their radial outer ends.

13. A variable diameter pulley as defined in claim 12 wherein each said pair of pistons supports three parallel circumferentially spaced cylindrical rods at the radial outer end thereof, said lift rods being of equal diameter and having longitudinal axes lying in an arcuate plane parallel to the axis of rotation of the pulley.

14. A variable diameter pulley as defined in claim 2 wherein said guide plates have an equal number of radial slots defining said opposed pairs of slots, said slots being equidistantly circumferentially spaced about said axis of rotation.

15. A variable diameter pulley as defined in claim 2 wherein each of said guide plates defines a support hub having an annular surface thereon concentric with said coaxial center axis, said discs being supported on said hubs for rotation relative to each other in planes substantially normal to said center axis.

16. A variable diameter pulley as defined in claim 1 wherein said oppositely directed intersecting arcuate guideways comprise equal but oppositely directed arcuately shaped guideways that cooperate with the corresponding guide plate radial slots to receive the opposite ends of said lift rods and effect equal parallel synchronized radial movement of the lift rods in response to actuation of said lift rod moving means.

17. A variable diameter pulley as defined in claim 1 wherein said means supported on said lift rods for defining a belt support surface comprises at least one elongated flexible spring-like support member having a first end fixed to a selected one of said lift rods and having a longitudinal length sufficient to enable a free end to extend circumferentially about the lift rods so as to define an annular belt support surface independently of the radial position of said lift rods.

18. A variable diameter pulley as defined in claim 1 wherein said means for defining a belt support surface comprises an elongated flexible spring-like member having a first end connected to a selected one of said lift rods and having a longitudinal length sufficient to circumferentially overlie all of the lift rods and establish a generally annular belt support surface externally of said lift rods independently of the radial positions of the lift rods.

19. A variable diameter pulley as defined in claim 1 including a housing defining an internal chamber, said variable diameter pulley being substantially disposed within said chamber.

20. A variable speed transmission comprising, in combination:
a housing,
a pair of variable diameter pulleys as defined in claim 1 supported by said housing with the axes of rotation of said pulleys being disposed in parallel spaced coplanar relation; and
an endless belt supported on said belt support surfaces so as to interconnect said pair of pulleys, a selected one of said pulleys having an input shaft for effecting rotation thereof about its longitudinal axis, the other of said pulleys having an output shaft, said means for selectively moving said lift rods radially to vary the diameter of each belt support surface being operative to selectively vary the rotational speed of said output shaft for a given rotational speed of said input shaft.

21. A variable speed transmission as defined in claim 20 including electronic sensors operative to sense the rotational position of each pulley during rotation, said sensors being cooperative with a source of fluid pressure to maintain selected pulley diameters and belt tension.

22. A variable speed transmission as defined in claim 20 wherein said lift rods are fixedly connected to the radial outer ends of radially moveable pistons.

23. A variable speed transmission as defined in claim 20 wherein said guide discs of each pair are rotatable relative to the juxtaposed guide plate, and are rotatable relative to each other during radial movement of said lift rods.

24. A variable speed transmission as defined in claim 20 wherein each pulley includes a spacer sleeve supporting a plurality of pairs of radially movable pistons, each pair of pistons having longitudinal axes lying in a radial plane containing an axis of rotation of the corresponding pulley and having a lift rod supported transversely on the outer ends of each pair of pistons.

25. A belt drive system comprising, in combination:
a pair of variable diameter drive and driven pulleys;
a belt interconnecting variable diameter belt support surfaces on said pulleys and operative to vary the rotational speed of the driven pulley in response to varying the diameters of said belt support surfaces;
each of said pulleys including axially spaced guide plates operatively associated with a spacer sleeve to define a fluid pressure chamber, said guide plates having radial through-slots;
diametrically aligned pairs of radially movable pistons supported by said spacer sleeves and having transverse lift rods on radial outer ends thereof;
a pair of coaxial guide discs juxtaposed outboard of each guide plate and having oppositely directed arcuate slots cooperative with said radial through-slots to receive opposite ends of the lift rods and effect equal synchronous radial movement of the lift rods in response to pressure changes within the fluid pressure chamber; and
each of said pulleys having an elongated flexible spring-like support member attached at one end to a lift rod and extending in supported relation circumferentially about the lift rods to define said variable diameter belt support surfaces, said diametrically aligned pistons being adapted for telescoping relation during radial inward movement of the lift rods.

26. A belt drive system as defined in claim 25 including electronic sensors operative to sense the rotational position of each pulley during rotation, said sensors being cooperative with a source of fluid pressure to maintain selected pulley diameters and belt tension.

27. A belt drive system as defined in claim 25 wherein said lift rods are fixedly connected to the radial outer ends of radially moveable pistons.

28. A belt drive system as defined in claim 25 wherein said guide discs of each pair are rotatable relative to the juxtaposed guide plate, and are rotatable relative to each other during radial movement of said lift rods.

* * * * *